United States Patent [19]

Duan et al.

[11] Patent Number: 5,807,919
[45] Date of Patent: Sep. 15, 1998

[54] WATER-BASED SULFONATED POLYMER COMPOSITIONS

[75] Inventors: Youlu Duan, Maplewood; Yi Wei, White Bear Lake; Yuduo Zhu, Woodbury, all of Minn.

[73] Assignee: H.B. Fuller Licensing & Financing, Inc., St. Paul, Minn.

[21] Appl. No.: 689,752

[22] Filed: Aug. 13, 1996

[51] Int. Cl.$^6$ ..................................... C08J 3/02
[52] U.S. Cl. .................. 524/501; 524/507; 524/457; 524/591
[58] Field of Search ............................ 524/457, 501, 524/507, 591

[56] References Cited

U.S. PATENT DOCUMENTS

| | | | |
|---|---|---|---|
| 4,491,646 | 1/1985 | Gruber et al. | 524/558 |
| 4,888,383 | 12/1989 | Huybrechts | 524/832 |
| 5,071,904 | 12/1991 | Martin et al. | 524/458 |
| 5,173,526 | 12/1992 | Vijayendran et al. | 524/457 |
| 5,200,463 | 4/1993 | Flakes | 524/591 |
| 5,204,404 | 4/1993 | Werner, Jr. et al. | 524/501 |
| 5,326,809 | 7/1994 | Bott et al. | 524/459 |
| 5,334,690 | 8/1994 | Schafheutle et al. | 528/71 |
| 5,371,133 | 12/1994 | Stanley | 524/457 |
| 5,523,344 | 6/1996 | Maksymkiw et al. | 524/507 |
| 5,541,251 | 7/1996 | Bontinck et al. | 524/507 |
| 5,608,000 | 3/1997 | Duan et al. | 524/507 |
| 5,610,232 | 3/1997 | Duan et al. | 524/507 |
| 5,624,758 | 4/1997 | Maksymkiw et al. | 428/423.1 |
| 5,637,639 | 6/1997 | Duan et al. | 524/507 |

Primary Examiner—Judy M. Reddick
Attorney, Agent, or Firm—Nancy N. Quan

[57] ABSTRACT

A method for the preparation of sulfonated polymer compositions wherein water dispersible isocyanate-terminated polyurethane prepolymers are reacted in the presence of aqueous polyvinyl dispersions which may contain active hydrogen atoms. The inventive compositions develop interpenetrating polymer networks, which may form core-shell type structures, and are characterized as having enhanced mechanical and adhesion properties.

20 Claims, No Drawings

WATER-BASED SULFONATED POLYMER COMPOSITIONS

FIELD OF THE INVENTION

This invention relates to water-based polymers, specifically to a method for the preparation of water-based sulfonated polymer compositions having enhanced mechanical and adhesion properties.

BACKGROUND OF THE INVENTION

There are several patents which disclose the preparation of water-based sulfonated polymer compositions:

U.S. Pat. No. 5,334,690 (Hoechst Aktiengesellschaft, Fed.) discloses water-based sulfonated polyurethane-urea polymers which can be combined with and are in general compatible with other aqueous polymer dispersions.

U.S. Pat. No. 4,888,383 (E. I. DuPont De Nemours and Company) discloses a process wherein water-based polyurethane-urea modified acrylic polymers are prepared by reacting amine and/or hydrazide functional polyacrylic polymers with isocyanate-terminated polyurethane prepolymers.

U.S. Pat. No. 4,491,646 (Ashland) discloses adhesives wherein hydroxyl functional polyvinyl polymers are blended with water dispersible polyfunctional isocyanates.

Other related patents include U.S. Pat. No. 5,371,133 (National Starch), U.S. Pat. No. 5,200,463 (Huels), U.S. Pat. No. 5,204,404 (DuPont), U.S. Pat. No. 5,173,526 (Air Products & Chemicals, Inc.) and U.S. Pat. No. 5,071,904 (PPG).

SUMMARY OF THE INVENTION

The present invention discloses water-based sulfonated polymer compositions comprising:

A) At least one water-based sulfonated polyurethane-urea polymer comprising:
 1) at least one polyisocyanate; and
 2) at least one sulfonated polyester polyol wherein the sulfo groups are present in the form of alkali metal salts;
B) At least one aqueous polyvinyl dispersion comprising;
 1) at least one ethylenically unsaturated monomer;
 2) and optionally, at least one free radically reactive protective colloid comprising active hydrogen atoms;
C) And optionally, at least one sulfonated polyurethane-vinyl polymer composition which is the reaction product of;
 1) at least one isocyanate-terminated polyurethane prepolymer comprising;
  a) at least one polyisocyanate; and
  b) at least one sulfonated polyester polyol wherein the sulfo groups are present in the form of alkali metal salts; with
 2) an aqueous polyvinyl dispersion comprising;
  a) at least one ethylenically unsaturated monomer;
  b) and optionally, at least one free radically reactive protective colloid comprising active hydrogen atoms.

Surprisingly, the sulfonated polymer compositions have enhanced mechanical and adhesion properties and show stability at pH values greater than about 2.0. It is surmised that some of these unique properties can be attributed to the development of interpenetrating polymer networks and the sulfonate character located in the polyol segment of the polyurethane polymer.

The inventive compositions are useful as adhesives, binders, coatings and primers on any substrate including paper, wood, metals, concrete, glass, cloth and synthetic polymers, and are useful in applications including fiber glass sizing, woodworking, automotive, film laminating and in the manufacture of shoes.

In another aspect, the present invention discloses a method for the preparation of sulfonated polymer compositions wherein isocyanate-terminated polyurethane prepolymers are dispersed in aqueous polyvinyl dispersions which may contain primary amines, secondary amines, primary hydroxyl groups, secondary hydroxyl groups and formamide groups. The method comprising:

A) Forming a water dispersible isocyanate-terminated polyurethane prepolymer by reacting;
 1) at least one polyisocyanate; and
 2) at least one sulfonated polyester polyol wherein the sulfo groups are present in the form of alkali metal salts;
B) Forming an aqueous polyvinyl dispersion by free radically polymerizing;
 1) at least one ethylenically unsaturated monomer;
 2) and optionally, at least one free radically reactive protective colloid comprising active hydrogen atoms; then
C) dispersing the product of (A) into (B).

DETAILED DESCRIPTION OF THE INVENTION

The sulfonated polymer compositions have enhanced mechanical and adhesion properties compared to their corresponding water-based sulfonated polyurethane-urea polymers, aqueous polyvinyl dispersions and their simple blends. It is surmised that some of these unique properties can be attributed to the formation of interpenetrating polymer networks. The term "interpenetrating polymer network" is defined as a crosslinked and/or semi crosslinked system comprising at least two dissimilar or different polymers. IPNs are further described in the "Handbook of Adhesives", Irving Skeist, 3rd edition, chapter 1, page 18, Van Nostrand, N.Y., 1990.

In the present invention, when isocyanate-terminated polyurethane prepolymers are dispersed in aqueous polyvinyl dispersions which may contain active hydrogen atoms such as primary amines, secondary amines, primary hydroxyl groups and secondary hydroxyl groups, the isocyanate-terminated polyurethane prepolymer dispersions interact with the aqueous polyvinyl dispersions to form IPNs and/or crosslinked networks. The frequency of such interactions can be influenced by the quantity of isocyanate and active hydrogen atoms present in the respective polymer dispersions. It is possible to increase the crosslink density using a structured aqueous polyvinyl dispersion wherein active hydrogen atoms are distributed on the surface of the particle. A structured particle can be generated when ethylenically unsaturated monomers, containing active hydrogen atoms, are added at the end of the free radical emulsion polymerization process. It is surmised such a particle morphology improves the collision frequency of the isocyanate/active hydrogen atom reaction to increase the composition's crosslink density.

Furthermore, it is surmised that the dispersed particles can contain a complex mixture of polymers consisting of sulfonated polyurethane-urea polymers, polyvinyl polymers and sulfonated polyurethane-vinyl polymers. The complex particle mixtures can be formed when substantially dissimilar or substantially different polymers diffuse and interact or crosslink with adjacent particles. Such diffusion processes may generate particles having polymers within the particle that are different when compared with polymers on the surface of the particle. Examples include particles having substantially polyvinyl based polymers on the surface of predominantly polyurethane-urea based particles or substantially polyurethane-urea based polymers on the surface of predominantly polyvinyl based particles. Such surface layers may be continuous or non-continuous and can vary in thickness. If a particles surface layer has a substantial thickness, as well as being continuous, then the particles approach a core-shell type structure.

The isocyanate-terminated polyurethane prepolymers of the present invention may be formed using monoisocyanates and polyisocyanates. The isocyanates may be linear aliphatic, cyclic aliphatic, aromatic and mixtures thereof. Examples of commercially available polyisocyanates include Vestanat® IPDI which is isophorone diisocyanate from HULS America Inc. (Piscataway, N.J.), TMXDT® which is tetramethylxylene diisocyanate from Cyanamid (Wayne, N.J.), Luxate® HM which is hexamethylene diisocyanate from Olin Corporation (Stamford, Conn.), diphenylmethane diisocyanate from Upjohn Polymer Chemicals (Kalamazoo, Mich.), Desmodur® W which is dicyclohexylmethane-4,4'-diisocyanate from Bayer Corporation (Pittsburgh, Pa.) and toluene diisocyanate (TDI). The preferred diisocyanates are hexamethylene diisocyanate, isophorone diisocyanate and their mixtures.

If desired, small quantities of polyisocyanates which have an isocyanate content greater than 2.1 may be used. Additionally, modified polyisocyanates which are prepared from hexamethylene diisocyanate, isophorone diisocyanate and toluene diisocyanate may also be used. Said polyisocyanates can have functionalities including urethanes, uretdiones, isocyanurates, biurets and mixtures thereof.

The sulfonated polyester polyol component used in the preparation of the isocyanate-terminated polyurethane prepolymer can have hydroxyl numbers, as determined by ASTM designation E-222-67 (METHOD B), in a range from about 20 to about 140, and preferably from about 40 to about 110. The polyols may be formed with components such as diacids, diols, sulfonate diols and sulfonate diacids. Such polyols and their preparation are further described in U.S. Pat. No. 5,334,690, incorporated herein by reference. The preferred sulfonated polyester polyols are based on 5-sulfoisophthalic acid monosodium salt, adipic acid and 1,6-hexanediol and/or diethylene glycol. It is surmised the sulfonate character, which is present in the polyol segment, enhances the polymers dispersibility and stability at reduced pH.

Optionally, non-sulfonated polymeric diols may be used in combination with the sulfonated polyester polyols. Such polyols may have hydroxyl numbers in a range from about 20 to about 140, and preferably from about 40 to about 110. The non-sulfonated polymeric polyols may include polyester polyols, polyether polyols, polycarbonate polyols, polyurethane polyols, polyacetal polyols, polyacrylate polyols, polycaprolactone polyols, polyesteramide polyols, polythioether polyols, and mixtures thereof.

Alkylene diols may also be used in the preparation of the isocyanate-terminated prepolymers. The alkylene diols may have hydroxyl numbers in a range from about 130 to about 1250, and preferably from about 950 to about 1250. The preferred alkylene diols include 1,4-butanediol, 1,6-hexanediol and 2-methyl-1,3-propanediol and may be present in the isocyanate-terminated polyurethane prepolymer in a range from about 0.1% by weight to about 10.0% by weight, and preferably from about 0.5% by weight to about 5.0% by weight, based on 100 part total prepolymer solids.

Higher functional polyols may be used in the preparation of the polyurethane-urea polymers. Suitable examples include glycerol, trimethylolpropane, 1,2,4-butane triol, 1,2,6-hexane triol and mixtures thereof. The preferred higher functional polyol is trimethylolpropane. Said polyols may be present in a range from about 0.1% by weight to about 1.0% by weight, and preferably from about 0.3% by weight to about 0.7% by weight, based on 100 parts total isocyanate-terminated polyurethane prepolymer solids.

Optionally, dihydroxy carboxylic acids may be used when preparing the isocyanate-terminated polyurethane prepolymer. A preferred dihydroxy carboxylic acid is dimethylolpropionic acid. The dihydroxy carboxylic acid component may be present in a range from about 0.05% by weight to about 1.0% by weight, and preferably from about 0.2% by weight to about 0.5% by weight, based on 100 parts total polyurethane prepolymer solids.

Neutralization of said dihydroxy carboxylic acid groups can be accomplished with compounds such as alkali metal hydroxides, organic tertiary amines, ammonia and mixtures thereof. Preferred neutralizing agents are sodium hydroxide and triethylamine. Conversion of the acid groups to ionic groups (salts) can be accomplished before or after the isocyanate-terminated polyurethane prepolymer has been dispersed in the polyvinyl dispersion mixture.

The isocyanate-terminated polyurethane prepolymer is prepared by reacting a stoichiometric excess of polyisocyanate with said polyol components. The reactants are in such proportions that the resulting percent isocyanate may be in a range from about 1.0% by weight to about 10.0% by weight, and preferably from about 2.0% by weight to about 5.0% by weight, based on 100 parts total prepolymer solids. Said prepolymers may be processed at temperatures in a range from about 30° C. to about 110° C., and preferably from about 65° C. to about 85° C.

Additionally, small quantities of catalysts may be used to accelerate the hydroxyl/isocyanate reaction. The catalysts can be present in a range from about 0.05% by weight to about 2.0% by weight, and preferably from about 0.13% by weight to about 0.15% by weight, based on 100 parts total isocyanate-terminated polyurethane prepolymer solids. An example includes Metacure™ T-12 which is an organic tin compound from Air Products and Chemicals, Inc. (Allentown, Pa.).

The ethylenically unsaturated monomers can include monounsaturated monomers, polyunsaturated monomers and mixtures thereof. Examples include methyl acrylate, ethyl acrylate, n-butyl acrylate, isobutyl acrylate, n-propylacrylate, iso-propyl acrylate, methyl methacrylate, butyl methacrylate, vinyl acetate, vinyl propionate, vinyl ethers, ethylenically unsaturated fumerates, ethylenically unsaturated maleates, styrene, acrylonitrile, acrylamides, butanediol diacrylate, hexanediol diacrylate, ethylene glycol dimethacrylate, trimethylolpropane triacrylate and pentaerythritol triacrylate.

Ethylenically unsaturated monomers containing anionic and/or ionic groups can be used. Examples of such monomers include acrylic acid, methacrylic acid, fumaric acid, crotonic acid, itaconic acid, mesaconic acid, maleic acid, citraconic acid and/or their corresponding ionic groups. Said monomers may be in a range from about 0.1% by weight to about 25.0% by weight, and preferably from about 0.1% by weight to about 10.0% by weight, based on 100 parts total solids.

Ethylenically unsaturated monomers containing active hydrogen atoms may also be used. The term "active hydrogen atoms" refers to hydrogen which display activity according to the Zerewitinoff test as described by Kohler in J. Am. Chem. Soc., 49, 3181 (1927). Examples include hydroxyethyl acrylate, allyl alcohol, allyl amine, N-methylol acrylamide, mono-acrylic acid esters of glycols, itaconic acid and methyl-3-aminocrotonate.

Amine and hydroxyl functional protective colloids may be used to prepare the aqueous polyvinyl dispersions of the present invention. Suitable examples include the water dispersible poly(vinyl alcohol)—co-poly(vinyl amine) polymers described in EP 0599245 assigned to Air Products and Chemicals, Inc. (Allentown, Pa.). Such protective colloids may have an amine content in a range from about 0.5 meq. amine/gram material to about 3.5 meq. amine/gram material, and preferably from about 1.0 meq. amine/gram material to about 3.0 meq. amine/gram material. The number average molecular weight may be in a range from about 10,000 grams/mol. to about 350,000 grams/mol., and preferably from about 30,000 grams/mol. to about 250,000 grams/mol. Said colloids can be present in a range from about 0.1% by weight to about 20.0% by weight, and preferably from about 0.5% by weight to about 5.0% by weight, based on 100 parts total polyacrylic solids. It is assumed grafting reactions occur during the emulsion polymerization process. The graft copolymerization process is further described in "Polyvinyl Alcohol Developments", edited by C. A. Finch, John Wiley & Sons, New York, 1992, pp. 449–453.

Specialty monomers may also be incorporated into the aqueous polyvinyl dispersions and include the amino organo-silane coupling agents described in U.S. Pat. No. 4,745,028 (PPG) and U.S. Pat. No. 5,236,982, Owens-Corning, the imidazolidinone functional wet adhesion monomers described in U.S. Pat. No. 5,496,907, H. B. Fuller Co. (St. Paul, Minn.) and the Vinamer EF monomer which is N-ethenylformamide from Air Products & Chemicals, Inc. (Allentown, Pa.).

When Vinamer EF monomers are incorporated into the aqueous polyvinyl dispersions, the bound formamide group may be hydrolyzed to a primary amine using catalysts such as bases or acids including sodium hydroxide, hydrochloric acid and sulfuric acid. The resulting amine functional polyvinyl dispersion can then be used as a reactive component in the process of the present invention.

The aqueous polyvinyl dispersions can be formed using materials and free radical polymerization processes known in the art. For example, the free radical initiators, used in the addition polymerization process, may be water-soluble, oil soluble and mixtures. Examples include hydrogen peroxide, sodium persulfate, potassium persulfate, ammonium persulfate, 2,2-azobis (2,4-dimethylpentanenitrile), 2,2-azobis (2-methylpropanenitrile) and mixtures such as t-butylhydroperoxide, Fe.EDTA and isoascorbic acid. Said initiators may be present in amounts from about 0.05% by weight to about 1.5% by weight, and preferably from about 0.1% by weight to about 0.5% by weight, based on 100 parts total solids. Also, oxidizing catalysts may be used independently or in combination with reducing agents such as sodium formaldehyde-sulfoxylate, ferrous salts, sodium dithionite, sodium hydrogen sulfite, sodium sulfite and sodium thiosulfate. The redox catalysts may be present in amounts from about 0.05% by weight to about 1.5% by weight, and preferably from about 0.1% by weight to about 0.5% by weight, based on 100 parts total solids.

The ethylenically unsaturated monomers are polymerized using free radical polymerization techniques known in the art. The free radical initiators can be added all at once, slowly over time or as a partial initial charge with the remainder being added slowly over time.

Free radical polymerization may be conducted at temperatures in a range from about 5° C. to about 85° C., and preferably from about 25° C. to about 80° C.

The water-based sulfonated polymer compositions of the present invention are formed using a method wherein isocyanate-terminated polyurethane prepolymers are dispersed in an aqueous polyvinyl dispersion which may contain primary amines, secondary amines, primary hydroxyl groups, secondary hydroxyl groups and formamide groups. It is also possible to disperse the isocyanate-terminated polyurethane prepolymer in water and then immediately blend with the aqueous polyvinyl dispersion. Optionally, the aqueous polyvinyl dispersion may be added to a neat or water dispersed isocyanate-terminated polyurethane prepolymer. The dissimilar polymers may be combined at temperature in a range from about 25° C. to about 95° C., and preferably from about 45° C. to about 75° C.

If amine functional aqueous polyvinyl dispersions are used, the polymer components may be blended using an equivalence ratio of amine active hydrogen to isocyanate in a range from about 1:10 to about 10:5, and preferably from about 1:5 to about 5:1.

If desired, water soluble compounds containing primary and/or secondary amines may be reacted with the polymer dispersion mixture of the invention. Suitable examples include monoethanolamine, ethylenediamine, diethylene triamine and ammonia.

The water-based sulfonated polymer compositions may have viscosities in a range from about 10 mPa.s to about 1,000 mPa.s, and preferably from about 10 mPa.s to about 500 mPa.s. The particle size distribution may be monomodal or multimodal and generally have a mean diameter in a range from about 0.01 microns to about 2.0 microns.

The water-based sulfonated polymer compositions may have a solids content in the range from about 20% by weight to about 70% by weight, and preferably from about 35% by weight to about 55% by weight.

The dried sulfonated polymer compositions may have single and/or multiple glass transition (Tg.) temperatures in a range from about –100° C. to about +200° C.

The characteristics of the water-based sulfonated polymer compositions may be modified by the addition of compounds including surfactants, defoaming agents, coalescing aids, fungicides, bactericides, polyfunctional crosslinking agents, plasticizers, thickening agents, fillers, pigments, reactive pigments, dispersing agents for the pigments, colors, perfume-like materials, UV stabilizers, sequestering agents, waxes, oils, fire retardant agents and organic solvents. Such materials may be introduced at any stage of the production process.

The present invention is further illustrated by the following examples.

EXAMPLES

In the examples, the following test methods were used.

Tensile Strength and Elongation:

The polymer dispersions were cast to generate dried films having a thickness in a range from about 20 mils. to about 40 mils. Type V dogbones were cut with a Dewes Gumbs Die and conditioned at least 24 hours in an environment having 50% relative humidity at 23° C. The samples were run using STM D-638 at a crosshead speed of 5.0 cm./min.

Shear Strength:

The polymer dispersions were coated on steel, acrylonitrile-butadiene-styrene (ABS) and glass then dried 24 hours. Like substrates were mated using hand pressure then heat activated at 70° C. for 30 minutes. The samples, which has a bond area of 0.5×1.0 in$^2$, were run using ASTM-D-1002 at a crosshead speed of 1.27 cm./min.

Example 1

Example 1 describes the preparation of a water-based sulfonated polyurethane-vinyl polymer composition. The composition and its properties are compared to its corresponding polymer components.

Compound 1

Compound 1 describes the preparation of an aqueous polyvinyl dispersion using a reactive emulsifying agent which is polyvinyl alcohol-polyvinylamine copolymer (PVOH-PVAM) from Air Products & Chemicals, Inc. (Allentown, Pa.).

|   |   | Grams |
|---|---|---|
| (1) Reactor charge |   |   |
|   | PVOH/PVAM | 1.50 |
|   | (6% vinyl amine, medium M.W.) |   |
|   | De-ionized water | 350.00 |
|   | Acetic acid | 0.30 |
| (2) Pre-emulsion |   |   |
|   | Methyl Methacrylate | 155.00 |
|   | N-butyl acrylate | 145.00 |
|   | Methacrylic acid | 3.90 |
|   | Thiolacetic acid | 0.10 |
| (3) Delayed Surfactant feed |   |   |
|   | T-Det 0-407 from Harcros | 7.50 |
|   | De-ionized water | 30.00 |
| (4) Initiator feed |   |   |
|   | T-butyl hydroperoxide | 1.28 |
|   | De-ionized water | 20.00 |
| (5) Reducer feed |   |   |
|   | Sodium formaldehyde sulfoxide | 0.92 |
|   | De-ionized water | 20.00 |

To a reactor equipped with an agitator, thermometer, condenser and nitrogen purge was added reactor charge (1). The mixture was heated to 65° C. and agitated for 30 minutes. While maintaining the reaction temperature at 65° C., the pre-emulsion (2) and surfactant feed (3) was added over a 3 hour period. The initiator feed (4) and reducer feed (5) were added over a 3.5 hour period. Once all the materials were added, the dispersion was heated an additional 30 minutes. The polymer had a solids content of 33.2% and a pH of 2.65.

Compound 2

Compound 2 describes the preparation of a water-based sulfonated polyurethane-urea polymer.

A reactor was charged with 4.5 grams (0.099 hydroxyl equivalence) 2-methyl-1,3-propanediol and 95.4 grams (0.093 hydroxyl equivalence) molten Rucoflex® XS-5570-55 which is a sulfonated polyol from RUCO Polymer Corporation based on 5-sulfoisophthalic acid monosodium salt (4% by weight), adipic acid and diethylene glycol. The mixture was charged with 39.96 grams isophorone diisocyanate, 1 drop of dibutyl tin dilaurate and heated to 80° C. for 2 hours. The resulting isocyanate-terminated polyurethane prepolymer was dispersed in 247.0 grams de-ionized water at 70° C., using mild agitation, and heated an additional 2 hours at 65° C.

Compound 3

Compound 3 describes the preparation of water-based sulfonated polyurethane-vinyl polymer.

139.86 grams of a isocyanate-terminated polyurethane prepolymer (the prepolymer of Compound 2), which had a temperature of 80° C., was dispersed in 139.86 grams de-ionized water and agitated for 5 minutes. The dispersed prepolymer was charged with 341.5 grams of an amine and hydroxyl functional polyvinyl dispersion (Compound 1). The mixture was agitated and heated to 65° C. for 2 hours. The water-based sulfonated polyurethane-vinyl polymer had a solids content of 40.2% and a pH of 6.4.

The compounds were tested for tensile strength, elongation and shear strength on glass, steel and acrylonitrile-butadiene-styrene copolymers (ABS). The results are diagrammed below:

| Compound | Tensile Strength (Kgs./cu. cm.) | Elongation (%) | Shear Strength (Kgs./cu. cm.) | | |
|---|---|---|---|---|---|
| | | | Steel/Steel | Glass/Glass | ABS/ABS |
| Compound 1 | 117.40 | 1,020 | 20.38 | 18.98 | 40.07 |
| Compound 2 | 60.45 | 3,810 | 18.98 | 21.79 | 26.71 |
| Compound 3 | 75.92 | 1,680 | 33.04 | 40.07 | 39.36 |
| Compound 1 & 2 (50/50 Blend) | 44.29 | 1,130 | 21.79 | 26.71 | 37.26 |

The data shows the sulfonated polyurethane-vinyl polymer (Compound 3) has enhanced mechanical properties compared to the blend of Compound 1 & 2. The data also shows Compound 3 has enhanced adhesion properties compared to Compound 1, Compound 2 and their 50/50 blend showing the utility of the invention.

Example 2

Example 2 describes the preparation of a water-based sulfonated polyurethane-vinyl polymer using vinyl acetate. The inventive polymer properties are compared to its corresponding polymer components.

Compound 1

Compound 1 describes the preparation of an aqueous polyvinyl acetate dispersion using a reactive emulsifying agent, which is polyvinyl alcohol-polyvinylamine copolymer (PVOH—PVAM), from Air Products & Chemicals, Inc. (Allentown, Pa.).

The polymer was prepared as described in Example 1 (Compound 1) with the exception that the pre-emulsion contained 265.0 grams vinyl acetate, 35.0 grams n-butyl acrylate, 3.9 grams methacrylic acid and 0.10 grams thiolacetic acid. The resulting polymer dispersion had a solid content of 33.6% and a pH of 2.5.

Compound 2

Compound 2 describes the preparation of a sulfonated polyurethane prepolymer.

The polymer was prepared exactly as described in Example 1 (Compound 2).

Compound 3

Compound 3 describes the preparation of a water-based sulfonated polyurethane-vinyl acetate polymer.

139.86 grams of an isocyanate-terminated polyurethane prepolymer described as Compound 2, which had a temperature of 80° C., was dispersed in 247 grams de-ionized water (70° C.) and agitated for approximately 10 minutes. The dispersed prepolymer was charged with 341.5 grams of the amine and hydroxyl functional polyvinyl dispersion described as Compound 1. The mixture was mildly agitated and heated to 65° C. for 2 hours. The resulting water-based sulfonated polyurethane-vinyl acetate polymer composition had a solids content of 35.5% and a pH of 6.5.

The compounds were tested for tensile strength, elongation and shear strength on glass, steel and acrylonitrile-butadiene-styrene copolymers (ABS). The results are diagrammed below:

| Compound | Tensile Strength (Kgs./cu. cm.) | Elongation (%) | Shear Strength (Kgs./cu. cm.) | | |
|---|---|---|---|---|---|
| | | | Steel/ Steel | Glass/ Glass | ABS/ ABS |
| Compound 1 | 131.46 | 330 | 9.14 | 3.51 | 16.17 |
| Compound 2 | 60.45 | 3,810 | 18.98 | 21.79 | 26.71 |
| Compound 3 | 120.91 | 1,190 | 26.71 | 32.33 | 34.45 |
| Compound 1 & 2 (50/50 Blend) | 71.00 | 920 | 18.28 | 33.74 | 47.10 |

The data shows the sulfonated polyurethane-vinyl acetate polymer (Compound 3) has enhanced mechanical properties compared to the blend of Compounds 1 & 2. The data also shows Compound 3 has enhanced adhesion properties compared to Compound 1 and Compound 2 showing the utility of the invention.

Example 3

Example 3 describes the preparation of a water-based sulfonated polyurethane-vinyl polymer wherein the amine functional polyvinyl dispersion is formed using Vinamer EF monomer which is N-ethenylformamide from Air Products & Chemicals, Inc. (Allentown, Pa.).

Compound 1

Compound 1 describes the preparation of an amine functional polyvinyl dispersion using N-ethenylformamide.

| | Grams |
|---|---|
| (1) Reactor charge | |
| De-ionized water | 295.0 |
| Potassium persulfate | 0.42 |
| (2) Pre-emulsion | |
| De-ionized water | 80.0 |
| T-Det 0-407 (Hacros) | 8.86 |
| Foamaster 111 | 0.325 |
| Potassium persulfate | 0.55 |
| Methyl methacrylate | 155.0 |
| N-butyl acrylate | 155.0 |
| Methacrylic acid | 0.5 |
| (3) Initiator feed | |
| De-ionized water | 20.0 |
| Potassium persulfate | 0.42 |
| (4) Monomer feed | |
| Vinamer EF | 3.1 |

The pre-emulsion was prepared using the following procedure. The water, surfactant, defoamer and initiator were combined and agitated for 15 minutes. The monomers were added to this mixture over a 30 minute period, using agitation, to form a milky white pre-emulsion.

To a reactor equipped with an agitator, thermometer, condenser and nitrogen purge was added the reactor charge (1). The materials were heated to approximately 80° C. and charged with 2% of the total pre-emulsion then stirred an additional 15 minutes. While maintaining a reaction temperature of 80° C., the pre-emulsion (2) was added over a 3 hour period. The monomer feed (4) was added approximately 1.5 hours after the pre-emulsions initial feed. Once all the materials were added, the reaction mixture was heated an additional 30 minutes. To the dispersion was charged 3.1 grams Igepal CO-710, which is a surfactant from Rhone-Poulenc, and the reaction mixture was heated an additional hour to allow the complete free radical polymerization of said monomers. The incorporated Vinamer EF monomer was then hydrolyzed to a primary amine. This was accomplished by adding 17.5 grams of a 5% sodium hydroxide solution and heating an additional 2 hours at 80° C.

Compound 2

Compound 2 describes the preparation of a water-based sulfonated polyurethane-vinyl polymer.

To a reaction flask was charged 95.4 grams (0.093 hydroxyl equivalence) Rucoflex® XS-5570-55 and 4.5 grams 2-methyl-1,3-propanediol. The materials were heated to 50° C. and then charged with 39.96 grams isophorone diisocyanate and 1 drop of dibutyl tin dilaurate. The mixture was heated an additional 2 hours at 80° C. The resulting isocyanate-terminated polyurethane prepolymer was dispersed in a solution containing 315 grams of an amine frictional polyvinyl polymer (Compound 1) and 244 grams deionized water. The dispersion was stirred for 2 hours at 60° C.

The compounds mechanical and adhesion properties are diagrammed below:

| Compound | Tensile Strength (Kgs./cu. cm.) | Elongation (%) | Shear Strength (Kgs./cu. cm.) | | |
|---|---|---|---|---|---|
| | | | Steel/ Steel | Glass/ Glass | ABS/ ABS |
| Compound 1 | 55.46 | 1,987 | 10.89 | 14.34 | 23.90 |
| Compound 2 | 48.36 | 2,118 | 19.47 | 17.78 | 27.27 |

Example 4

Example 4 describes the preparation of water-based polymer compositions wherein isocyanate-terminated sulfonated polyurethane prepolymers are dispersed in hydroxy functional water-based polyacrylic dispersions.

Compound 1

Compound 1 describes the preparation of a hydroxyl functional polyacrylic dispersion wherein the hydroxyl groups are within the latex particle.

| | Grams |
|---|---|
| (1) Reactor charge | |
| De-ionized water | 275.0 |
| Methacrylic acid | 1.0 |
| (2) Pre-emulsion | |
| De-ionized water | 80.0 |
| T-Det 0-407 (Hacros) | 8.86 |
| Methyl methacrylate | 155.0 |
| N-butyl acrylate | 155.0 |
| Hydroxyl ethyl acrylate | 10.85 |
| N-dodecyl mercaptan | 0.31 |
| (3) Initiator feed | |
| De-ionized water | 20.0 |
| T-butyl hydroperoxide | 1.37 |
| (4) Reducer feed | |
| De-ionized water | 20.0 |
| Sodium formaldehyde sulfoxide | 0.97 |

To a reactor equipped with an agitator, thermometer, condenser and nitrogen purge was added the reactor charge (1). The water was heated to approximately 65° C. and then charged with 3% of the total pre-emulsion. While maintaining a reaction temperature of 65° C., the pre-emulsion (2), initiator feed (3) and reducer feed (4) were added over a 4 hour period. After completing the addition, the reaction mixture was heated an additional hour. The dispersion had a solids content of 45.2%, a pH of 2.65 and a number average particle size diameter of 443 nanometers.

Compound 2

Compound 2 describes the preparation of a hydroxyl functional polyacrylic dispersion wherein a portion of the hydroxyl groups are distributed on the surface of the particle.

| | Grams |
|---|---|
| (1) Reactor charge | |
| De-ionized water | 275.0 |
| Methacrylic acid | 1.0 |
| (2) Pre-emulsion | |
| De-ionized water | 80.0 |
| T-Det 0-407 (Hacros) | 8.86 |
| Methyl methacrylate | 155.0 |
| N-butyl acrylate | 155.0 |
| N-dodecyl mercaptan | 0.31 |
| (3) Initiator feed | |
| De-ionized water | 20.0 |
| T-butyl hydroperoxide | 1.37 |
| (4) Reducer feed | |
| De-ionized water | 20.0 |
| Sodium formaldehyde sulfoxide | 0.97 |

To a reactor equipped with an agitator, thermometer, condenser and nitrogen purge was added the reactor charge (1). The water was heated to approximately 65° C. and then charged with 3% of the total pre-emulsion. While maintaining a reaction temperature of 65° C., the pre-emulsion (2) was added over a 3 hour period while the initiator feed (3) and reducer feed (4) were added over a 4 hour period. The reaction mixture was charged with 10.85 grams hydroxyl ethyl acrylate after addition of approximately 75% of the pre-emulsion. Once all the materials were added, the reaction mixture was heated an additional hour. The dispersion had a solids content of 45.2%, a pH of 2.65 and a number average particle size diameter of 443 nanometers.

Compound 3

Compound 3 describes the preparation of a sulfonated polyurethane prepolymer.

A reactor was charged with 4.5 grams (0.099 hydroxyl equivalence) 2-methyl-1,3-propanediol and 95.4 grams (0.093 hydroxyl equivalence) molten Rucoflex® XS-5570-55 which is a sulfonated polyol from RUCO Polymer Corporation based on 5-sulfoisophthalic acid monosodium salt (4% by weight), adipic acid and diethylene glycol. The mixture was charged with 39.96 grams isophorone diisocyanate, 1 drop of dibutyl tin dilaurate and heated to 80° C. for 2 hours.

Compound 4

Compound 4 describes the preparation of a water-based sulfonated polyurethane-urea polymer.

139.86 grams of the prepolymer (80° C.) described as Compound 3 was charged with 629.3 grams de-ionized water (65° C.) and stirred for 2 hours keeping the temperature below 65° C.

Compound 5

Compound 5 describes the preparation of a water-based sulfonated polyurethane-acrylic polymer composition.

139.86 grams of the prepolymer (80° C.) described as Compound 3 was dispersed in 309.4 grams of a hydroxyl functional polyacrylic dispersion (65° C.) described as Compound 1. The dispersion mixture was stirred for 5 minutes and then charged with 250.0 grams of de-ionized water (65° C.). The materials were heated an additional 2 hours at 65° C. to generate a polymer composition having a solids content of 40.2% and a pH of 6.5.

Compound 6

Compound 6 was prepared as similarly described as Compound 4 with the exception that 312.2 grams of the hydroxyl functional polyacrylic dispersion described as Compound 2 was used. The polymer composition had a solids content of 40% and a pH of 6.5.

The compounds mechanical properties are diagrammed below:

| Compound | Tensile Strength (Kgs./cu. cm.) | Elongation (%) |
| --- | --- | --- |
| Compound 1 | 71.8 | 1,484 |
| Compound 2 | 94.3 | 1,648 |
| Compound 4 | 60.7 | 3,807 |
| Compound 5 | 120.8 | 2,205 |
| Compound 6 | 117.0 | 2,437 |
| Compound 1 & 4 (50/50 Blend) | 61.0 | 2,620 |
| Compound 2 & 4 (50/50 Blend) | 68.3 | 2,537 |

The data shows the inventive polymer compositions (Compounds 5 & 6) have enhanced tensile strength compared to Compound 1, Compound 2, Compound 4, the 50/50 blend of Compound 1 & 4 and the 50/50 blend of Compound 2 & 4.

Example 5

Example 5 describes the preparation of a water-based sulfonated polyurethane-urea/polyvinyl polymer and its properties compared to its corresponding polymer components.

Compound 1

Compound 1 describes the preparation of a polyvinyl dispersion which is free of active hydrogen atoms.

| | Grams |
| --- | --- |
| (1) Reactor charge | |
| De-ionized water | 290.0 |
| (2) Pre-emulsion | |
| De-ionized water | 90.0 |
| T-Det 0.407 (Hacros) | 15.0 |
| Methyl methacrylate | 170.0 |
| N-butyl acrylate | 180.0 |
| Methacrylic acid | 7.0 |
| N-dodecyl mercaptan | 7.0 |
| (3) Initiator feed | |
| De-ionized water | 30.0 |
| T-butyl hydroperoxide | 2.15 |
| (4) Reducer feed | |
| De-ionized water | 30.0 |
| Sodium formaldehyde sulfoxide | 2.10 |

To a reactor equipped with an agitator, thermometer, condenser and nitrogen purge was added (1) the reactor charge. The water was heated to approximately 65° C. and then charged with 3% by weight of the total pre-emulsion. While maintaining a reaction temperature of 65° C., the (2) pre-emulsion, (3) initiator feed and (4) reducer feed were added over a 3 hour period. Once all the materials were added, the dispersion was heated an additional hour.

Compound 2

Compound 2 describes a water-based sulfonated polyurethane-urea polymer.

To a reaction vessel was charged 95.4 grams (0.093 hydroxyl equivalence) Rucoflex® XS-5570-55 and 4.5 grams 2-methyl-1,3-propanediol. The mixture was heated to 50° C. then charged with 39.96 grams isophorone diisocyanate and 1 drop of dibutyl tin dilaurate. The mixture was heated to 80° C. for approximately 2 hours using mild agitation. The isocyanate-terminated polyurethane prepolymer was then dispersed in 339.4 grams deionized water and charged with a solution containing 2.88 grams ethylene diamine, 1.09 grams diethylene triamine and 20 grams de-ionized water.

Compound 3

Compound 3 describes a water-based sulfonated polyurethane-urea/polyvinyl dispersion.

To a reaction vessel was charged 95.4 grams (0.093 hydroxyl equivalence) Rucoflex® XS-5570-55 and 4.5 grams 2-methyl-1,3-propanediol. The mixture was heated to 50° C. then charged with 39.96 grams isophorone diisocyanate and 1 drop of dibutyl tin dilaurate. The mixture was heated to 80° C. for approximately 2 hours using mild agitation. The isocyanate-terminated polyurethane prepolymer was then dispersed in a solution containing 339.4 grams de-ionized water and 969.3 grams of the polyacrylic dispersion described above. Said solution was adjusted to a pH of 9.3, using 10% sodium hydroxide/water mixture, before the dispersion process. The resulting isocyanate-terminated polyurethane prepolymer/polyvinyl dispersion was charged with a solution containing 2.88 grams ethylene diamine, 1.09 grams diethylene triamine and 20 grams de-ionized water. The resulting water-based sulfonated polyurethane-urea/polyvinyl polymer had a solids content of 35% and a pH of 9.0.

The compounds described above were tested for shear strength on glass, steel and acrylonitrile-butadiene-styrene copolymers (ABS). The results are diagrammed below:

| Shear Strength | Shear Strength (Kgs/cu. cm.) | | |
| --- | --- | --- | --- |
| (Kgs./sq. cm.) | Glass/Glass | Steel/Steel | ABS/ABS |
| Compound 1 | 41.6 | 55.95 | 19.19 |
| Compound 2 | 20.87 | 11.17 | 25.94 |
| Compound 3 | 75.71 | 59.82 | 31.21 |
| Compound 1 & 2 (50/50 Blend) | 23.48 | 23.97 | 23.12 |

The data shows the inventive polymer (Compound 3) has increased shear strength compared to Compound 1, Compound 2 and the 50/50 blend of Compound 1 & 2 showing the utility of the invention.

What is claimed is:

1. A water-based sulfonated polyurethane composition comprising:
   a) at least one sulfonated polyurethane-urea polymer comprising the reaction product of:
      1) at least one polyisocyanate;
      2) at least one dihydroxy carboxylic acid; and
      3) at least one sulfonated polyester polyol wherein the sulfo groups are present in the form of alkali metal salts;
   b) at least one aqueous vinyl polymer dispersion comprising the free radically polymerized product of:
      1) at least one ethylenically unsaturated monomer; and
      2) at least one free radically reactive protective colloid comprising active hydrogen atoms; and c) at least one water-based sulfonated polymer composition comprising the reaction product of:
   1) at least one isocyanate-terminated sulfonated polyurethane prepolymer comprising the reaction product of:
      i) at least one polyisocyanate;
      ii) at least one dihydroxy carboxylic acid; and
      iii) at least one sulfonated polyester polyol wherein the sulfo groups are present in the form of alkali metal salts; with
   2) at least one aqueous vinyl polymer dispersion comprising the reaction product of:
      i) at least one ethylenically-unsaturated monomer; and
      ii) at least one free radically reactive protective colloid comprising active hydrogen atoms.

2. The composition as described in claims 1, wherein said protective colloid bas active hydrogen atoms comprising amines.

3. The composition as described in claim 2, wherein said amines are primary amines.

4. The composition as described in claim 2, wherein said protective colloid has an amine content in a range from about 1.0 milliequivalent per gram material to about 3.0 milliequivalent per gram material.

5. The composition as described in claim 2, wherein said protective colloid has a number average molecular weight dstribution in a range from aboupt 30,000 grams per mole to about 250,000 gram per mole.

6. The composition as described in claim 2, wherein said protective colloid is present in the aqueous vinyl polymer dispersion in a range from about 0.5 percent by weight to about 5.0 percent by weight based on total solids.

7. The composition as described in claim 1, wherein said water-based composition forms an adhesive when dried.

8. The composition as described in claim 7, wherein said adhesive has a shear strength value greater than about 30 kilograms per cubic centimeter.

9. The composition as described in claim 1, wherein said polyisocyanate is selected from the group consisting of linear aliphatic polyisocyanates, cyclic aliphatic polyisocyanates, aromatic polyisocyanates and mixtures thereof.

10. The composition as described in claim 1, wherein said polyisocyanate is selected from the group consisting of hexamethylene diisocyanate, isophorone diisocyanate and mixtures thereof.

11. The composition as described in claim 1, wherein said dihydroxy carboxylic acid is dimethylolpropionic acid.

12. The composition as described in claim 1, wherein said sulfonated polyester polyol is formed from 5-sulfoisophthalic acid monosodium salt, adipic acid and 1,6-hexanediol.

13. The composition as described in claim 1, wherein said sulfonated polyester polyol has a hydroxy number in a range of from about 40 to about 110.

14. The composition as described in claim 1, wherein said sulfonated polyurethane-urea polymer and sulfonated polyurethane prepolymer further comprise the reaction product of at least one non-sulfonated polymeric diol.

15. The composition as described in claim 14, wherein said non-sulfonated polymeric diol is selected from the group consisting of polyester polyol, polyether polyol, polycarbonate polyol, polyurethane polyol, polyacetal polyol, polyacrylate polyol, polycaprolactone polyol, polyesteramide polyol, polythioether polyol and mixtures thereof.

16. The composition as described in claim 14, wherein said non-sulfonated polymeric polyol bas a hydroxyl number in a range of from about 40 to about 110.

17. The composition as described in claim 1, wherein said sulfonated polyurethane-urea polymer and sulfonated polyurethane prepolymer further comprise the reaction product of at least one alkylene diol having a hydroxyl number in a range from about 950 to about 1250.

18. The composition as described in claim 17, wherein said alkylene diol is selected from the group consisting of 1,4-butanediol, 1,6-hexanediol, 2-methyl-1,3-propanediol and mixtures thereof.

19. The composition as described claim 1, wherein said ethylenically-unsaturated monomer is selected from the group consisting of monounsaturated monomers, polyunsaturated monomers and mixtures thereof.

20. The composition as described in claim 19, wherein said ethylenically-unsaturated monomer is selected from the group consisting of acrylates, vinyl acetate, vinyl ethers, ethylenically-unsaturated fumarates, ethylenically-unsaturated maleates, styrene, acrylonitrile, acrylamides, diacrylates, triacrylates, N-ethenylformamide and mixtures thereof.

* * * * *